(12) United States Patent
Fiegen et al.

(10) Patent No.: US 12,510,266 B2
(45) Date of Patent: *Dec. 30, 2025

(54) FAN POWERED EXHAUST HOOD

(71) Applicant: TRANE INTERNATIONAL INC., Davidson, NC (US)

(72) Inventors: Joseph J. Fiegen, La Crosse, WI (US); Joseph R. Orr, Houston, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 442 days.

This patent is subject to a terminal disclaimer.

(21) Appl. No.: 17/710,304

(22) Filed: Mar. 31, 2022

(65) Prior Publication Data

US 2022/0221188 A1 Jul. 14, 2022

Related U.S. Application Data

(63) Continuation of application No. 15/726,012, filed on Oct. 5, 2017, now Pat. No. 11,300,318.

(51) Int. Cl.
*F24F 13/04* (2006.01)
*F24F 3/044* (2006.01)
(Continued)

(52) U.S. Cl.
CPC ............... *F24F 13/04* (2013.01); *F24F 3/044* (2013.01); *F24F 7/08* (2013.01); *F24F 11/70* (2018.01);
(Continued)

(58) Field of Classification Search
CPC .. F24F 13/04; F24F 11/70; F24F 3/044; F24F 7/08; F24F 13/10; F24F 13/20;
(Continued)

(56) References Cited

U.S. PATENT DOCUMENTS

| 5,836,297 A | 11/1998 | Kawasaki |
| 5,916,023 A * | 6/1999 | Meyer ..................... D06F 58/14 34/235 |

(Continued)

FOREIGN PATENT DOCUMENTS

JP 2003130416 A * 5/2003

OTHER PUBLICATIONS

English translation of JP-2003130416-A, dated Jun. 4, 2024 (Year: 2024).*

(Continued)

*Primary Examiner* — Edelmira Bosques
*Assistant Examiner* — Brett Peterson Mallon
(74) *Attorney, Agent, or Firm* — HSML P.C.

(57) ABSTRACT

An air handling unit for a heating, ventilation, air conditioning, and refrigeration system wherein the exhaust air is drawn away from the return air flow by one or more fans located cantilevered on a wall of the air handling unit. The one or more fans may be located within an exhaust hood, through which the exhaust air exits the air handling unit. This air handling unit has a shorter length through elimination of an exhaust fan section. The exhaust air may be drawn through an exhaust damper before being driven into the exhaust hood by the one or more fans.

11 Claims, 7 Drawing Sheets

(51) Int. Cl.
  *F24F 7/00* (2021.01)
  *F24F 7/08* (2006.01)
  *F24F 11/70* (2018.01)
  *F24F 13/10* (2006.01)
  *F24F 13/20* (2006.01)

(52) U.S. Cl.
  CPC .............. *F24F 13/10* (2013.01); *F24F 13/20* (2013.01); *F24F 2007/001* (2013.01); *F24F 2013/205* (2013.01)

(58) Field of Classification Search
  CPC .. F24F 2007/001; F24F 2013/205; F24F 7/06; F24F 13/08
  See application file for complete search history.

(56) References Cited

U.S. PATENT DOCUMENTS

| | | | |
|---|---|---|---|
| 6,407,918 B1 | 6/2002 | Edmunds et al. | |
| 6,648,590 B2 | 11/2003 | Huang et al. | |
| 6,688,966 B2 | 2/2004 | Akhtar | |
| 6,791,836 B2 | 9/2004 | Cipolla et al. | |
| 6,961,248 B2 | 11/2005 | Vincent et al. | |
| 7,093,452 B2 | 8/2006 | Chee et al. | |
| 7,597,534 B2 | 10/2009 | Hopkins | |
| 8,360,834 B1 | 1/2013 | Semmes | |
| 9,249,980 B2 | 2/2016 | Tollar | |
| 9,845,969 B2 | 12/2017 | Ali | |
| 2003/0199245 A1* | 10/2003 | Akhtar | F24F 13/24 454/262 |
| 2014/0199938 A1* | 7/2014 | Badenhorst | E04F 17/04 454/345 |
| 2014/0242902 A1* | 8/2014 | Ali | F24F 1/00 454/359 |
| 2017/0010017 A1 | 1/2017 | Fiegen et al. | |
| 2018/0142700 A1 | 5/2018 | Hub et al. | |

OTHER PUBLICATIONS

Photographs of R3G560-AQ04-06 exhaust fan on Daikin Maverick Ii 50T rooftop unit, taken at least as early as Apr. 14, 2017.
Ochi, JP 2003-130416A English machine translation, May 8, 2003 (10 pages).

* cited by examiner

FAN POWERED EXHAUST HOOD

FIELD

This disclosure relates to an air handling unit of a heating, ventilation, air conditioning and refrigeration system, particularly to directing exhaust out of the air handling unit.

BACKGROUND

Air handling units typically include an exhaust fan in a cabinet space where return air is received from a building. The exhaust fan directs some of the return air towards an exhaust damper section, through an exhaust damper, and out of the air handling unit through an exhaust hood.

BRIEF SUMMARY

In an air handling unit, the air from the return air duct is drawn through an exhaust damper by a fan mounted on a wall in the air handling unit, and expelled through an exhaust hood. The fan draws air into a chamber connected to the exhaust hood or the exhaust hood itself, where it exits the air handling unit. This design provides a shorter required length and more efficient use of space by removing a traditional blower as the exhaust fan, and placing the fans into the space already provided for the exhaust hood.

Air handling unit embodiments may include a return air inlet, a wall having a first side facing the return air inlet chamber and a second side facing away from the return air inlet chamber, and fans mounted on the second side of the wall. In air handling unit embodiments, the fans have inlets on the first side of the wall. An exhaust hood is attached to an outside of the air handling unit. The fans may be one or more fans, or three fans or six fans. In an embodiment, the fans are arranged in one horizontal row of three. In an embodiment, the fans are arranged in two horizontal rows of three, with the two rows being vertically offset from one another. Each of the horizontal rows may be in a separate exhaust hood. Each of the fans may be a motorized impeller including a fan wheel, a motor, and a variable-frequency drive.

Rooftop air handling unit embodiments include a return air inlet, a chamber in fluid communication with the return air inlet, the chamber defined in part by a first wall. In rooftop air handling unit embodiments, the first wall has a first side facing the return air inlet chamber and a second side facing away from the return air inlet, with one or more fans mounted on the first wall such that they extend outwards on the second side of the wall. In rooftop air handling unit embodiments, the one or more fans each have an inlet in fluid communication with the first side of the wall. In rooftop air handling unit embodiments, an exhaust hood in fluid communication with the outlets of the one or more fans is mounted on an outside of the air handling unit. In rooftop air handling unit embodiments, a mixbox damper is located on a second wall of the chamber, the mixbox damper providing fluid communication between the chamber and a mixbox. In rooftop air handling units, there is a supply blower and a coil located between the mixbox and the supply blower. In rooftop air handling unit embodiments, there is a supply air outlet in fluid communication with a conditioned space. In rooftop air handling unit embodiments, the first wall may be a back wall of the air handling unit. In rooftop air handling unit embodiments, the exhaust hood may be mounted on the back wall of the air handling unit. In rooftop air handling unit embodiments, a filter may be located between the mixbox and the coil.

A method embodiment for directing airflows within an air handling unit of a heating, ventilation, air conditioning, and refrigeration (HVACR) system includes drawing an exhaust airflow including a portion of a return air flow through an exhaust damper, using one or more fans positioned cantilevered on a wall of the air handling unit, and directing the exhaust airflow into an exhaust hood. The wall may be a wall of the air handling unit that divides the inside of the air handling unit from the outside of the air handling unit. The exhaust hood may contain the fans. The air may pass through a screen in the exhaust hood as it exits the air handling unit. Each of the fans may be a motorized impeller including a fan wheel, a motor, and a variable-frequency drive. There may be multiple exhaust dampers. Each exhaust damper may be associated with one or more of the fans.

DETAILED DESCRIPTION

Figure 1A:
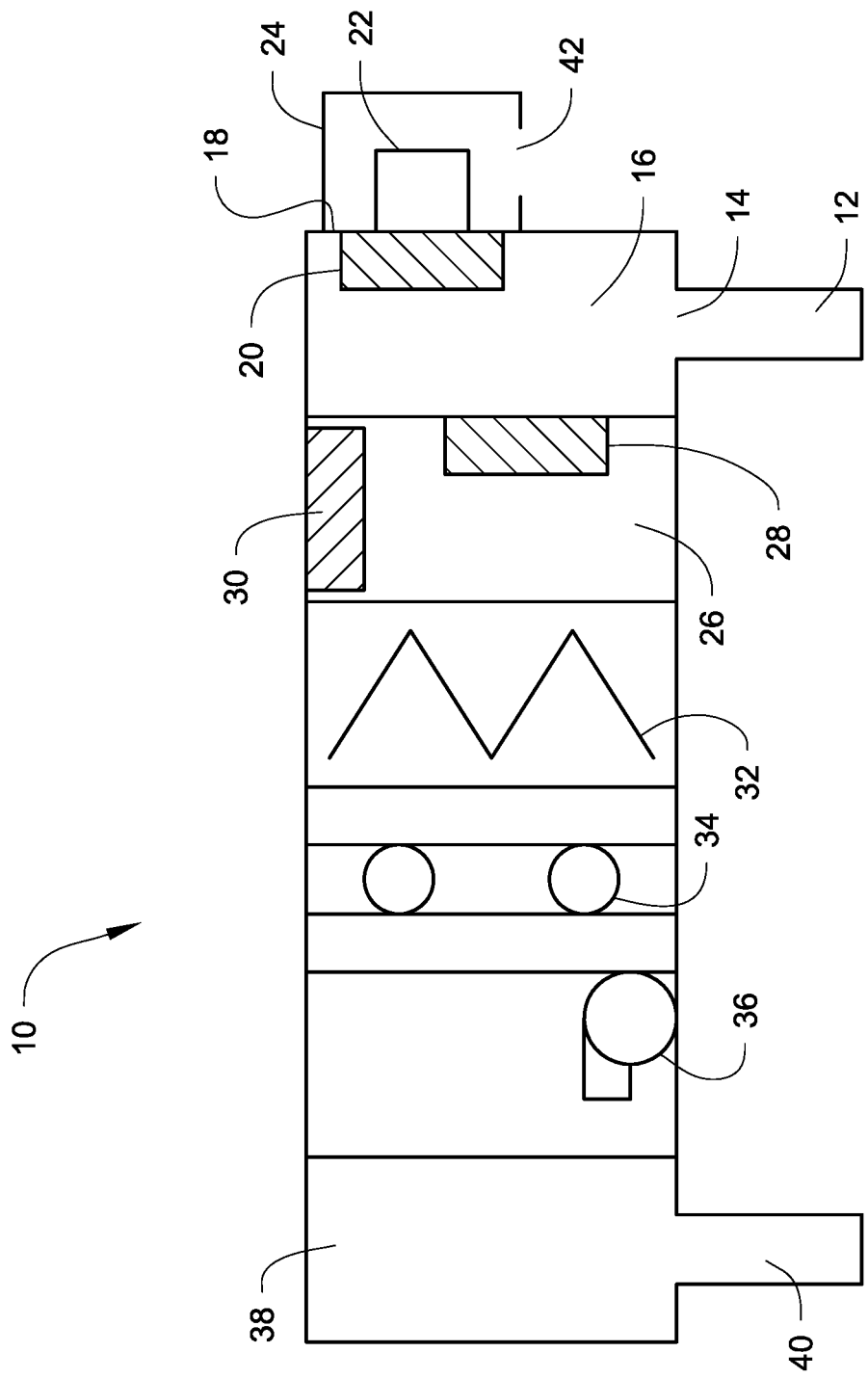
FIG. 1A shows a schematic of an air handling unit embodiment having one exhaust hood.

Air handling units for heating, ventilation, air conditioning and refrigeration (HVACR) units receive a flow of return air from the building to which they provide conditioned air. At least a portion of this return air flow is exhausted from the air handling unit.

FIG. 1 shows a schematic of an air handling unit embodiment from a side view. The air handling unit 10 is part of a HVACR system providing air to a conditioned space, for example, a rooftop HVACR unit providing air to a building. Return air duct 12 brings air from the conditioned space into the air handling unit 10. The air from the return air duct 12 travels through a return air inlet 14 and enters a return inlet air chamber 16 of the air handling unit 10. On a back wall 18 of the air handling unit 10, which in part defines return inlet air chamber 16, there are one or more exhaust dampers 20. Fan 22 is located cantilevered on a portion of the back wall 18 outside of return inlet air chamber 16. An exhaust hood 24 encloses fan 22 and receives air drawn through an exhaust damper 20 by fan 22. The outlet of fan 22 is in fluid communication with the exhaust hood 24. The damper(s) 20 are shown on the inlet side of fan(s) 22. It will be appreciated that the damper(s) 20 may be located on the a surface of the exhaust hood 24 where the fan(s) 22 blow air through the damper(s) 20. In the embodiment shown in FIG. 1, air that is not drawn through the one or more exhaust dampers 20 and exhausted via the exhaust hood 24 instead travels into mixbox 26 through mixbox damper 28, where it may combine with outdoor air brought in through outdoor air damper 30, then travels through filter 32, coil 34, supply fan 36, into discharge plenum 38 and ultimately is provided to the conditioned space, such as a building, through supply air outlet 40.

Return air duct 12 is a duct carrying air from the conditioned space into the air handling unit. Return air duct 12 receives air from the conditioned space serviced by the HVACR system including air handling unit 10, and directs the air back towards and into the air handling unit 10.

Return air inlet 14 is located where the return air duct 12 opens into air handling unit 10. The return air inlet 14 may be at the end of the return air duct 12. Air from return air duct 14 enters return inlet air chamber 16 of the air handling unit 10. Return inlet air chamber 16 may be located between a back wall 18 of the air handling unit 10 and the mixbox 26 of the air handling unit 10. It will be appreciated that the fan(s) and damper(s) may be located on another wall other than the back wall 18 (e.g. side wall, top wall) A mixbox damper 28 may control flow of air between the return inlet air chamber 16 and mixbox 26. An exhaust damper 20 may, in part, control flow between the return inlet air chamber 16 and exhaust hood 24.

Back wall 18 is a back wall of the air handling unit 10. Back wall 18 may divide the inside of the air handling unit 10, including return inlet air chamber 16, from the outside of the air handling unit 10. Exhaust hood 24 may be mounted on an outside side of back wall 18, opposite the return inlet air chamber 16 receiving air from return air duct 14. Back wall 18 may be formed from foam injected panels, with structural supports foamed in. In an embodiment, additional structural supports may be foamed into the panels and/or joined to the panels using adhesives.

Exhaust damper 20 may be located between the return inlet air chamber 16 and the exhaust hood 24. In an embodiment, exhaust damper 20 may be located on a surface of exhaust hood 24, and air may be blown through exhaust damper 20 into exhaust hood 24 by fan 22. In an embodiment, the exhaust damper 20 is located at an inlet of fan 22 and air is drawn through the exhaust damper into fan 22. There may be more than one exhaust damper, for example with the exhaust dampers arranged along the back wall 18 aligned in the vertical direction of the back wall 18 and arranged in a line extending in the horizontal direction of the back wall 18. In the view shown in FIGS. 1A and 1B, the horizontal direction of the back wall 18 extends into and out of the page.

Fan 22 may be, for example, a motorized impeller or a direct drive fan. There may be one or more fans located on back wall 18. One or more fans 22 may be located with an inlet facing an exhaust damper 20. In an embodiment, there are an equal number of fans 22 and exhaust dampers 20, and each individual fan 22 has its inlet facing an individual exhaust damper 20. Fan 22 may be powered by, for example, a variable speed electric motor. In an embodiment, fan 22 is powered by a motorized impeller. In an embodiment, fan 22 is powered by an electrically communicated motor. In an embodiment, fan 22 is an axial fan. The one or more fans may be in one or more rows in the horizontal direction of the back wall 18. For example, there may be a single horizontal row of three fans 22 mounted on back wall 18 and extending into exhaust hood 24. In an embodiment, fan 22 and exhaust damper 20 may be located on a side wall of the air handling unit 10.

Exhaust hood 24 encloses one or more of the fans 22. Exhaust hood 24 has an opening 42 through which exhaust air may leave the air handling unit 10. The opening 42 may be, for example, at the bottom of the exhaust hood 24, such that the exhaust air travels downwards as it leaves the exhaust hood 24. It will be appreciated that the opening 42 may be in other locations. In an embodiment, the opening 42 may be located on the side of the exhaust hood 24. It will also be appreciated that the damper(s) 20 may be located where the opening 42 is. The opening may be covered by a screen, grate, filter, etc. in order to prevent unwanted material such as, for example, debris, animals, etc. from entering the air handling unit 10. There may be multiple exhaust hoods 24 forming a horizontal line across, with each exhaust hood receiving air from one or more of the fans 22.

Mixbox 26 is where outside air may enter the air handling unit 10 through outdoor air damper 30, and where the portion of the return air that is not drawn into exhaust hood 24 may be mixed with outside air before continuing through the air handling unit 10.

Filter 32 is a filter through which the air passes before being circulated over the coil 34 and eventually into the building serviced by the HVACR system including air handling unit 10. Coil 34 heats or cools the air traveling through the air handling unit 10. Coil 34 is, for example, a heat exchanger through which a fluid travels to exchange heat with the air in air handling unit 10.

In the embodiment shown in FIG. 1A, return air inlet chamber 16 is in fluid communication with exhaust hood 24 through exhaust damper 20. In an embodiment, exhaust damper 20 is located on a wall of return air inlet chamber 16. In an embodiment, return air chamber 16 does not contain a blower.

Air passing through coil 34 is drawn into and driven by supply fan 36, which expels air into discharge plenum 38. Discharge plenum 38 is connected to supply air outlet 40, which carries air into the building serviced by the HVACR system including the air handling unit 10.

Figure 1B:
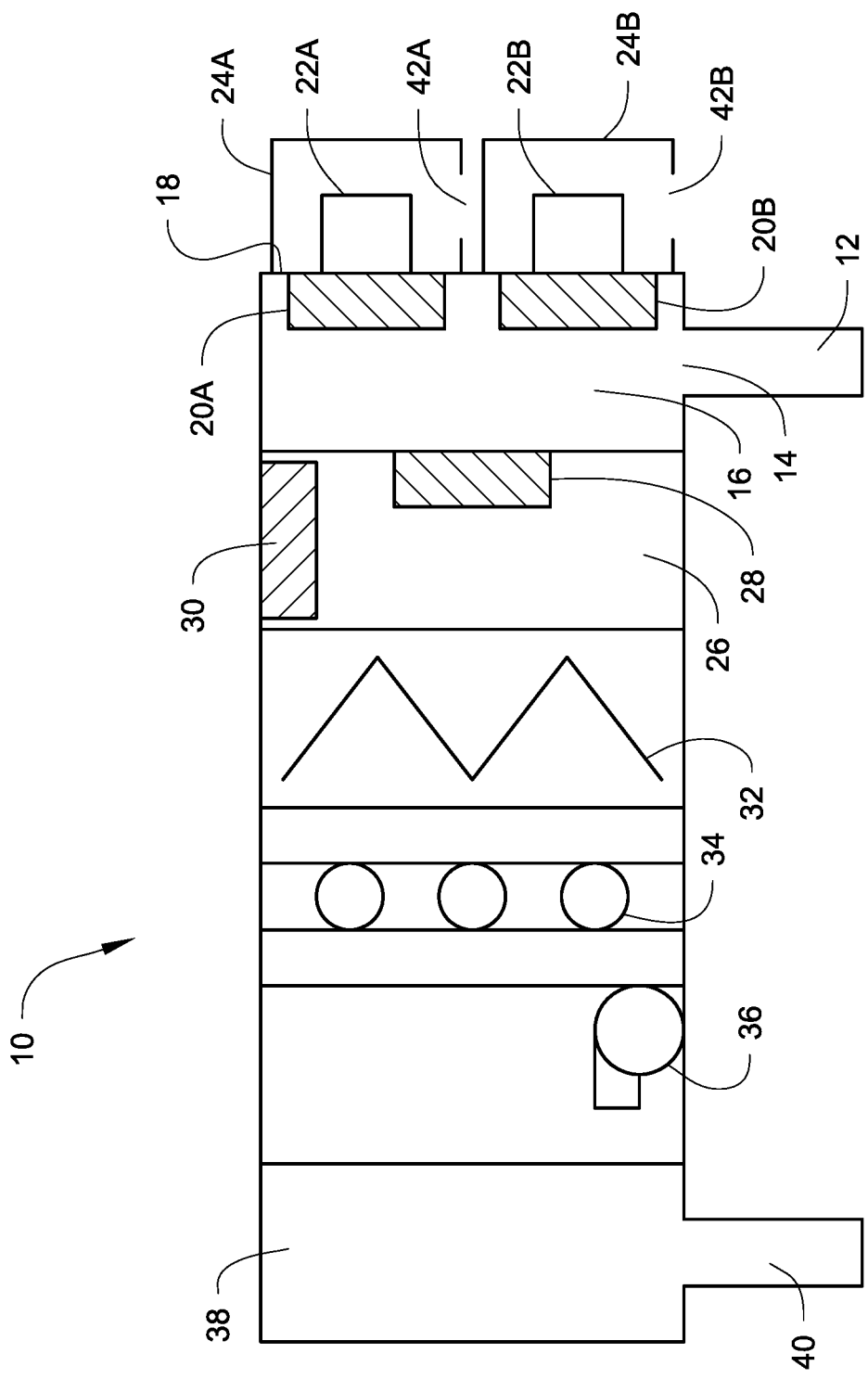
FIG. 1B shows a schematic of an air handling unit embodiment wherein there are two exhaust hoods, stacked on top of one another.

FIG. 1B shows a side view of a variation of the embodiment of FIG. 1A in which there are two separate exhaust hoods, first exhaust hood 24A and second exhaust hood 24B, mounted vertically displaced from one another. The first exhaust hood 24A and second exhaust hood 24B are each mounted on back wall 18. First one or more fans 22A may draw air from return inlet air chamber 16, through back wall 18, through first exhaust damper 20A, and into the first exhaust hood 24A. Second one or more fans 22B may draw air from return inlet air chamber 16, through back wall 18, through second exhaust damper 20B and into the second exhaust hood 24B. Air may be exhausted from exhaust hood 24A via opening 42A. Air may be exhausted from exhaust hood 24B via opening 42B. The one or more fans in each exhaust hood may be arranged in horizontal rows. In an embodiment, one or more fans 22 in each exhaust hood 24 are arranged in a vertical column. For example, each of first exhaust hood 24A and second exhaust hood 24B may contain a horizontal row of three fans 22A and 22B, respectively. Air that is not drawn into the first exhaust hood 24A or second exhaust hood 24B may enter mixbox 26 through mixbox damper 28, where it may mix with outside air entering through outside air damper 30, then travel through filter 32, coil 34, and then be driven by supply fan 36 into discharge plenum 38 and into the building via supply air outlet 40.

Figure 2:
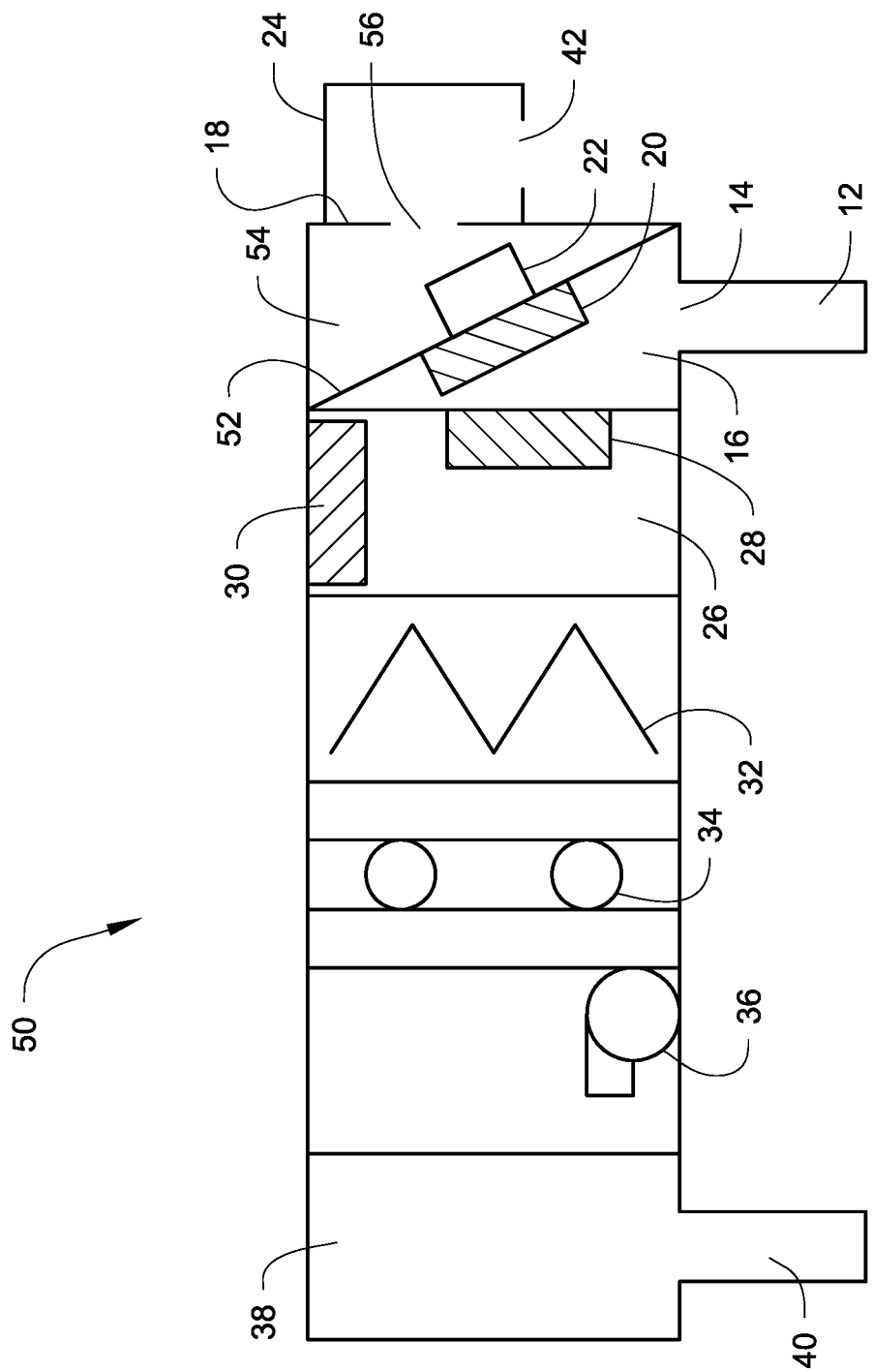
FIG. 2 shows a schematic of another air handling unit embodiment.

FIG. 2 shows a side view of a schematic of an embodiment of an air handling unit. Air handling unit 50 includes the return air duct 12 and return air inlet 14 as shown and described in FIG. 1. One or more fans 22 may be mounted on diagonal wall 52, drawing air into the space 54 defined by wall 52 and back wall 18. Air in space 54 may travel through openings 56 into exhaust hood 24, and leave the air handling unit 50 via the exhaust hood 24.

Diagonal wall 52 runs from a position at the floor of the air handling unit 50 between the return air duct 14 and the back wall 18 towards a position at the ceiling of the air handling unit 50 and away from the back wall 18, towards the mixbox 26. Diagonal wall 52 separates space 54 from the return air duct 14 and mixbox damper 28. In an embodiment, diagonal wall 52=extends the full height of the air handling unit, from the floor to the ceiling. In an embodiment, diagonal wall 52 connects to a sidewall and/or the wall supporting mixbox damper 26, while separating the exhaust path from the path of the return air inlet 14 to the return or mixbox damper 28. Diagonal wall 52 may extend from one side wall of the air handling unit to another. Diagonal wall 52 and back wall 18 of the air handling unit 50 define a space 54.

One or more fans 22 are mounted on diagonal wall 52. The one or more fans are mounted such that their inlet is towards the return inlet air chamber 16 receiving return air from the return air duct 14, and that their outlet is towards the space 54. The fans 22 draw a portion of the air within return inlet air chamber 16 into space 54. This may pressurize the air in space 54.

Air leaves space 54 through openings 56 which connect space 54 with the exhaust hood 24. In the embodiment shown in FIG. 2, the outlets of the one or more fans 22 are in fluid communication with the exhaust hood 24 via openings 56. Air then leaves air handling unit 50 through an opening 42 in the exhaust hood 24. Exhaust hood 24 may include screens, grates, filters, etc. to prevent the entry of unwanted material, such as, for example, debris, animals, etc. into the air handling unit 50 through the opening 42. There may be multiple exhaust hoods 24, arranged horizontally in a line or vertically displaced from one another, for example as shown in FIG. 1B. Each exhaust hood 24 may exhaust air from one or more openings 56 between space 54 and the exhaust hood 24.

Air that is not drawn into the space 54 may enter mixbox 26 through mixbox damper 28, mix with outside air entering through outside air damper 30, then travel through filter 32, coil 34, and then be driven by supply fan 36 into discharge plenum 38 and into the building via supply air outlet 40.

Figure 3:
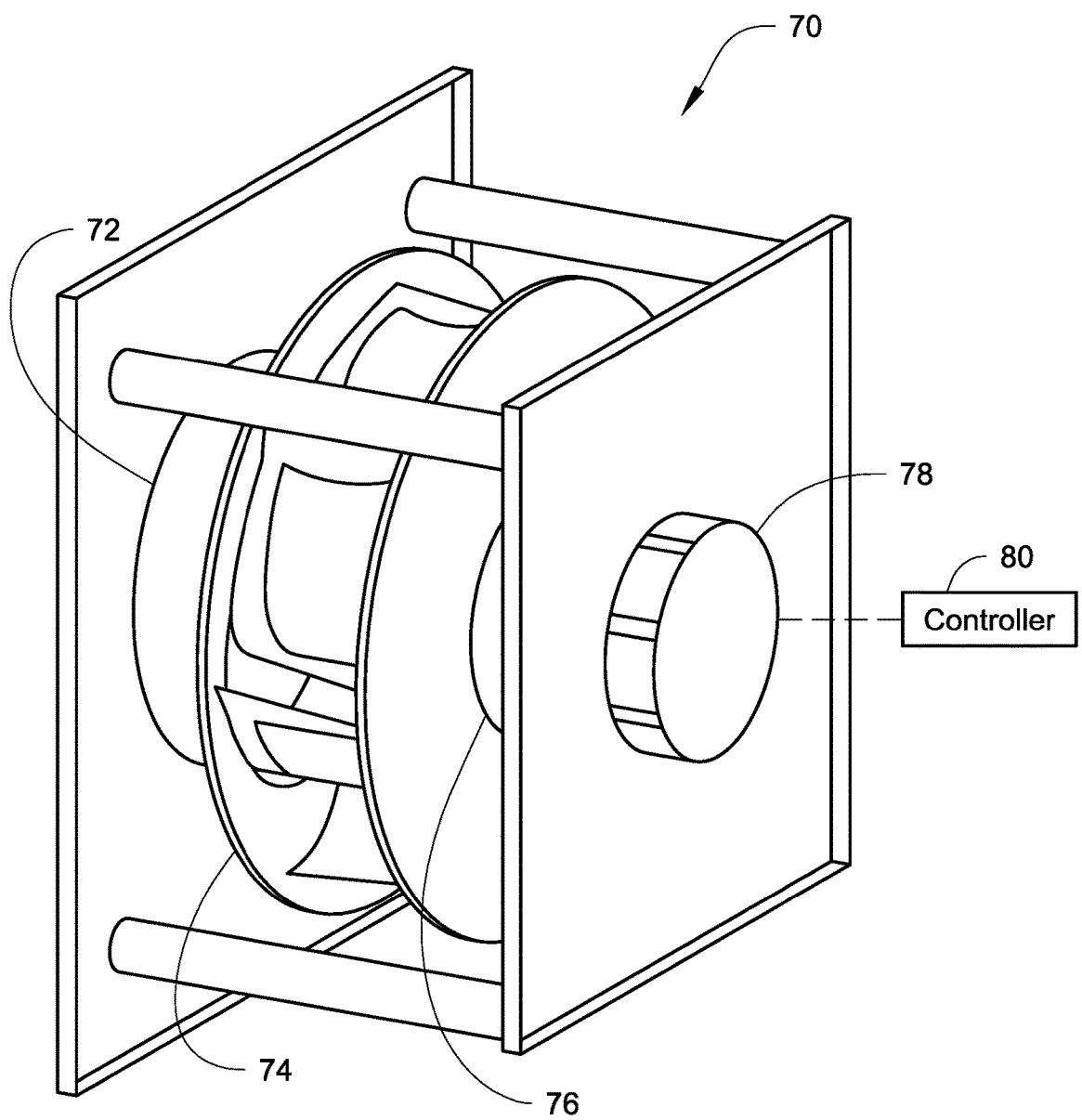
FIG. 3 shows a motorized impeller used in an embodiment.

FIG. 3 shows a motorized impeller 70 which may be used in an embodiment as a variable speed electric motor of one or more of the fans 22. The motorized impeller includes inlet 72, fan wheel 74, integrated motor 76, and variable-frequency drive 78.

Inlet 72 is an opening through which air can be drawn into the motorized impeller 70. Motorized impeller 70 may be mounted on a back wall 18 or a diagonal wall 52 of an air handling unit 10 or 50. The inlet 72 may be positioned towards the return inlet air chamber 16 that receives return air flow through the return air inlet 14.

Fan wheel 74 includes the blades. Fan wheel 74 is driven by integrated motor 76. Integrated motor 76 is located partially within the fan wheel. This positioning of the motor may provide a more compact design for the motorized impeller 70. The integrated motor may be an electric motor. The integrated motor 76 may be a brushless electric motor, for example an electronically commutate (EC) motor. The integrated motor 76 drives fan wheel 74 such that the blades of the fan wheel draw air through the inlet 72 and expel the air on the opposite side of back wall 18 or diagonal wall 52 from the inlet 72.

Variable-frequency drive 78 controls the integrated motor 76 to achieve a desired fan speed. The fan speed at which integrated motor 76 is operated affects the amount of air that is drawn through the motorized impeller 70 and exhausted via the exhaust hood 24. The variable frequency drive 78 may be connected to a controller 80 providing the desired fan speed at which to operate the integrated motor 76. The desired fan speed may be based on, for example, pressure within the building having the HVACR system including the air handling unit 10 or 50.

Figure 4:
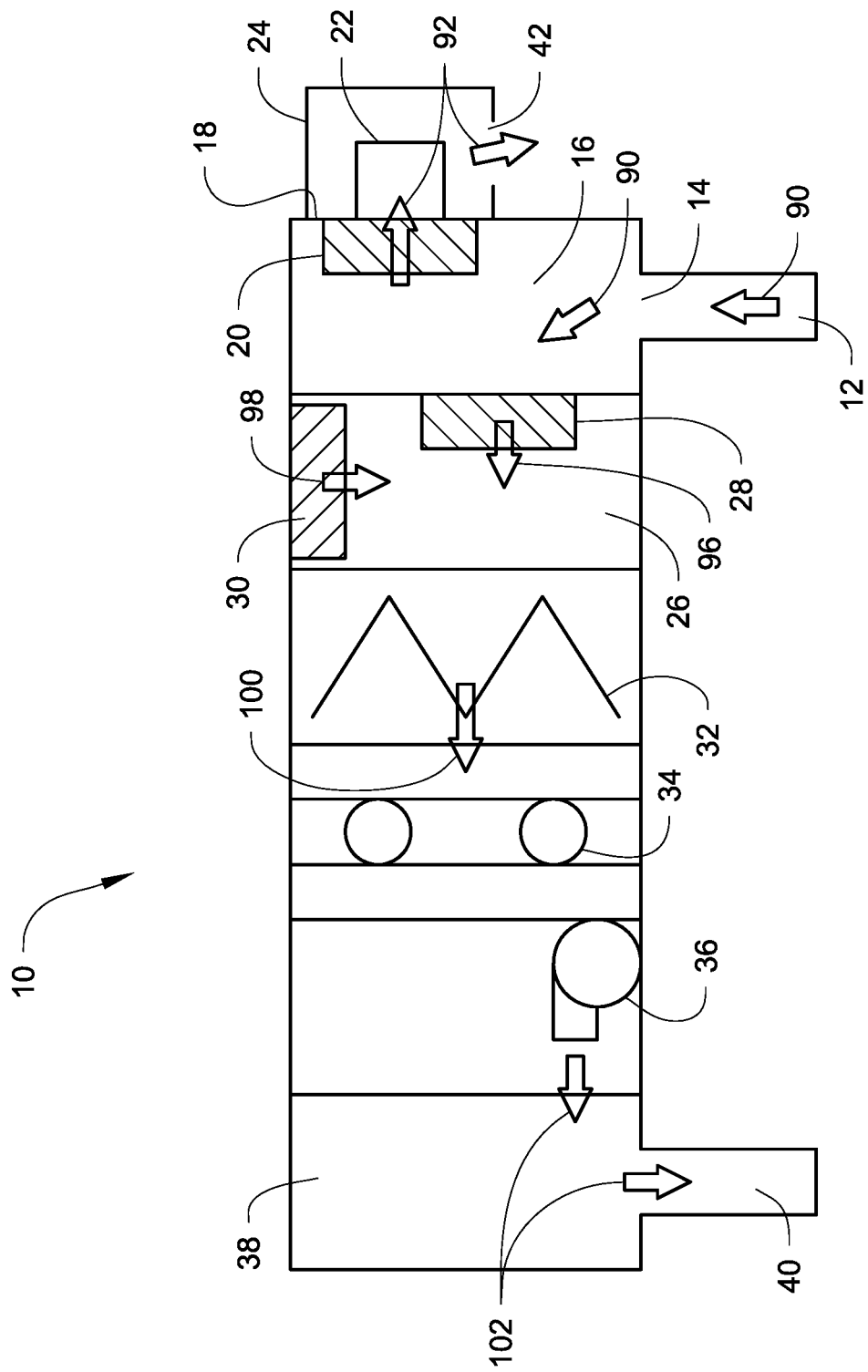
FIG. 4 shows airflow through the air handling unit shown in FIG. 1A during operation.

FIG. 4 shows airflow through the embodiment shown in FIG. 1. Return air flow 90 travels towards the air handling unit 10 through return air duct 12. The return air flow 90 travels through into air handling unit 10. A portion 92 of return air flow 90 is drawn through the fans 22 located on back wall 18. The portion 92 exits the fans 22 inside of exhaust hood 24. Airflow 92 leaves the exhaust hood 24 through an opening 42, for example at the bottom of the exhaust hood 24. Return air that is not part of the portion 92 drawn by the fans 22 into exhaust hood 24 forms airflow 96, entering the mixbox 26 through mixbox damper 28, where it mixes with outside airflow 98 drawn in through outside air damper 30. The combined airflow 100 then travels through filter 32, coil 34, and then is driven by supply fan 36 into discharge plenum 38 as supply airflow 102, which then travels into the building via supply air outlet 40.

Figure 5:
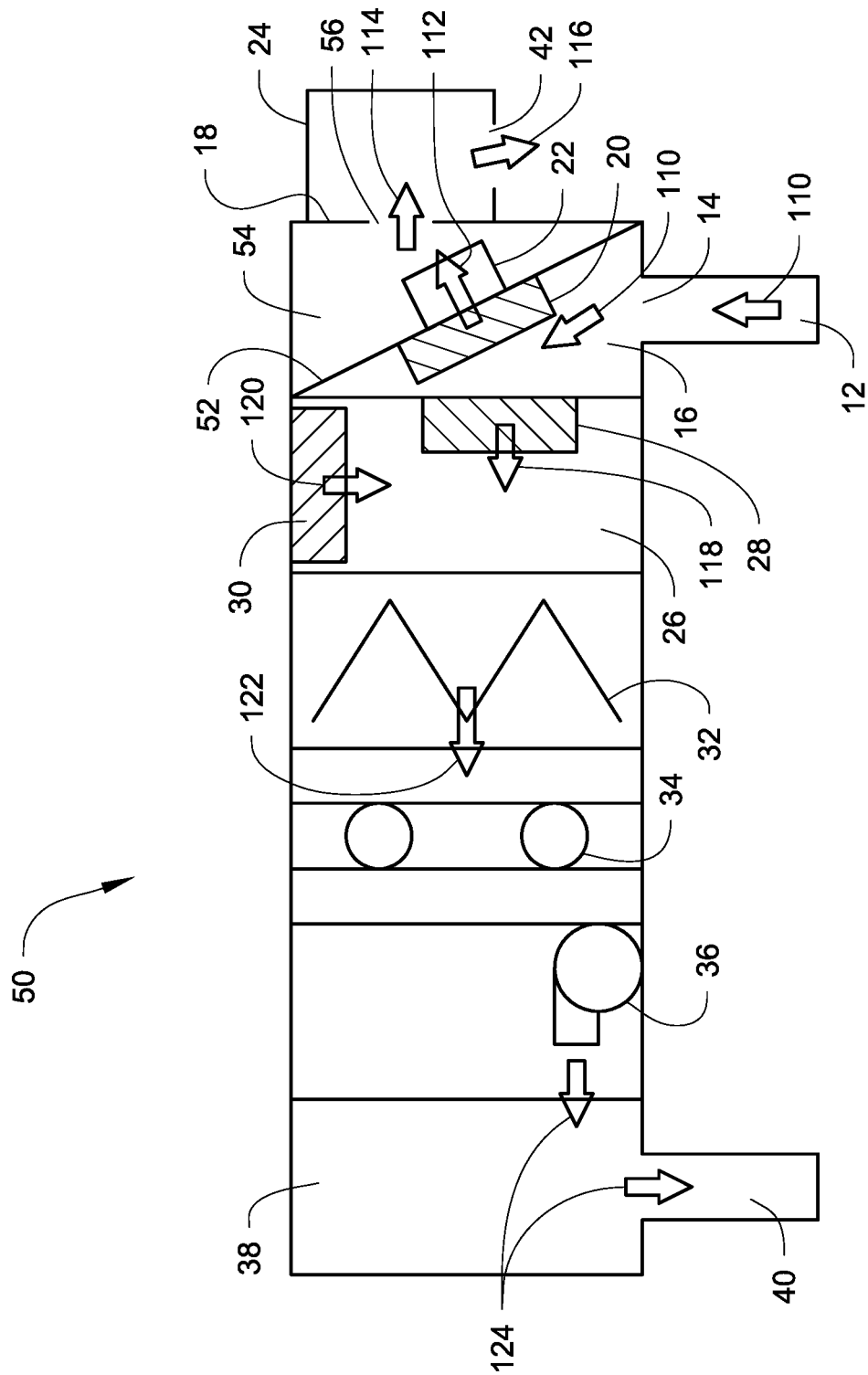
FIG. 5 shows airflow through the air handling unit shown in FIG. 2 during operation.

FIG. 5 shows airflow through the embodiment shown in FIG. 2. Return air flow 110 travels towards the air handling unit 50 through return air duct 12. The return air flow 110 is deflected by diagonal wall 52 and travels along diagonal wall 52. A portion 112 of the return air flow 110 is drawn in by the fans 22. The portion 112 is expelled into space 54 between diagonal wall 52 and the back wall 18 of the air handling unit 50. Airflow 114 in space 54 travels through one or more openings 56 in the back wall 58 of the air handling unit 50, into the exhaust hood 24. Airflow 116 leaves the exhaust hood 24 via one or more openings 42, for example at the bottom of the exhaust hood 24. Return air that is not part of the portion 112 drawn by the fans 22 into space 54 forms airflow 118, entering the mixbox 26 through mixbox damper 28, where it mixes with outside airflow 120 drawn in through outside air damper 30. The combined airflow 122 then travels through filter 32, coil 34, and then is driven by supply fan 36 into discharge plenum 38 as supply airflow 124, which then travels into the building.

Figure 6:
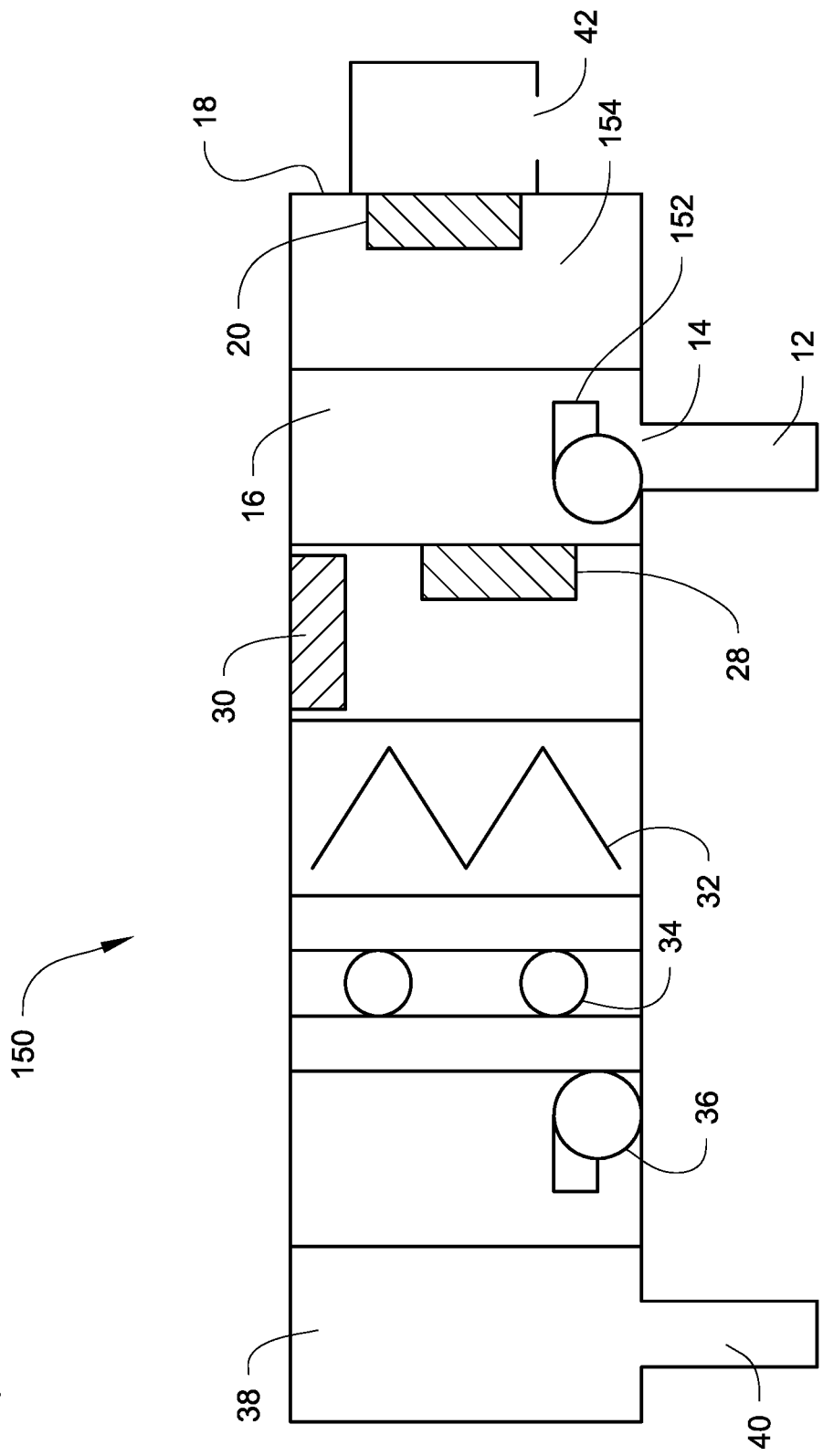
FIG. 6 shows a prior art air handling unit.

FIG. 6 shows a prior art air handling unit. Air enters the air handling unit 150 via the return air duct 12. Air from the return air duct is driven by exhaust fan 152, directing a portion into exhaust chamber 154. Exhaust chamber 154 may be pressurized by the portion of air directed into it from exhaust fan 152. Air in exhaust portion 154 may travel through exhaust damper 20 into exhaust hood 24, and exit the air handling unit 150 via an opening 42 in the exhaust hood 24. Prior art air handling unit 150 requires an additional exhaust chamber 154 and must accommodate exhaust fan 152, causing it to be longer and less space-efficient than the present invention. In the prior art embodiment shown in FIG. 6, air that is not directed into exhaust chamber 154 then travels through the mixbox damper 28 into the mixbox 26 where it may be mixed with outside air drawn in through outside air damper 30, and the air from the mixbox 26 travels through filter 32, coil 34, into supply fan 36 which drives the air into discharge plenum 38 and then into the building via supply air outlet 40.

Aspects: It is understood that any of aspects 1-8 may be combined with any of aspects 9-13 and/or aspects 14-20, and that any of aspects 9-13 may be combined with any of aspects 14-20.

Aspect 1: An air handling unit, comprising:
a return air inlet, a wall, having a first side facing return air inlet chamber and a second side facing away from the return air inlet, one or more fans, mounted on the wall such that they extend outwards on the second side of the wall, the one or more fans each having an inlet in fluid communication with the first side of the wall, and an exhaust hood mounted on an outside of the air handling unit.

Aspect 2: The air handling unit according to 1, wherein the one or more fans are each motorized impellers comprising:

a fan wheel,
a motor, and
a variable-frequency drive controlling a speed of the motor.

Aspect 3. The air handling unit according to any of aspects 1-2, further comprising a damper associated with each of the one or more fans, and wherein the damper is located between the return air inlet and the inlet of a fan associated with the damper.

Aspect 4. The air handling unit according to any of aspects 1-3, wherein the one or more fans are three fans.

Aspect 5. The air handling unit according to aspect 4, wherein the three fans are located on the wall in a horizontal line.

Aspect 6. The air handling unit according to any of aspects 1-4, wherein the one or more fans are six fans.

Aspect 7. The air handling unit according to aspect 6, wherein the six fans are located on the a back wall of the air handling unit in two horizontal lines of three fans each, and wherein the horizontal lines of three fans are vertically displaced from one another.

Aspect 8. The air handling unit according to of aspects 1-8, wherein the wall is a back wall of the air handling unit and wherein the first side faces an inside of the air handling unit and the second side faces an outside of the air handling unit.

Aspect 9. The air handling unit according to aspect 8, wherein the exhaust hood is mounted on the second side of the wall.

Aspect 10. The air handling unit according to any of aspects 1-9, wherein at least a portion of the one or more fans extends into the exhaust hood.

Aspect 11. A rooftop air handling unit, comprising:
a return air inlet,
a chamber in fluid communication with the return air inlet, the chamber defined in part by a first wall, wherein the first wall has a first side facing return air inlet chamber and a second side facing away from the return air inlet,
one or more fans, mounted on the first wall such that they extend outwards on the second side of the wall, the one or more fans each having an inlet in fluid communication with the first side of the wall,
an exhaust hood mounted on an outside of the air handling unit,
a mixbox damper, located on a second wall of the chamber, the mixbox damper providing fluid communication between the chamber and a mixbox,
a supply blower,
a coil, located between the mixbox and the supply blower, and
a supply air outlet in fluid communication with a conditioned space.

Aspect 12. The rooftop air handling unit according to aspect 11, wherein the first wall is a back wall of the air handling unit having a first side facing an inside of the air handling unit and a second side facing an outside of the air handling unit.

Aspect 13. The rooftop air handling unit according to any of aspects 11-12, wherein at least a portion of the one or more fans extend into the exhaust hood.

Aspect 14. The rooftop air handling unit according to any of aspects 11-13, further comprising a filter located between the mixbox and the coil.

Aspect 15. A method of exhausting air from an air handling unit, comprising:
drawing an exhaust airflow including a portion of a return air flow through an exhaust damper, using one or more fans positioned cantilevered on a wall of the air handling unit, and
directing the exhaust airflow into an exhaust hood.

Aspect 16. The method according to aspect 15, wherein the exhaust hood surrounds the one or more fans.

Aspect 17. The method according to any of aspects 15-16, wherein the exhaust airflow exits the air handling unit through a screen in the exhaust hood.

Aspect 18. The method according to any of aspects 15-17, wherein each of the one or more fans is a motorized impeller comprising:
a fan wheel,
a motor, and
a variable-frequency drive controlling a speed of the motor.

Aspect 19. The method according to any of aspects 15-18, wherein the exhaust damper is associated with one of the one or more fans.

Aspect 20. The method according to any of aspects 15-19, wherein the wall divides an interior of the air handling unit from an exterior of the air handling unit.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. An air handling unit, comprising:
a return air inlet,
a wall, having a first side facing a return air inlet chamber and a second side facing away from the return air inlet chamber, the wall being a side wall or a back wall of the air handling unit,
a mixbox damper, located on a second vertical wall of the return air inlet chamber, the mixbox damper providing fluid communication between the chamber and a mixbox,
one or more fans, each of the one or more fans including an inlet located on the side wall or the back wall, the inlet facing the return air inlet chamber, wherein:
each of the one or more fans is cantilevered on the wall such that it is outside the return air inlet chamber,
an exhaust hood mounted on the second side of the wall, the exhaust hood surrounding at least one of the one or more fans, the exhaust hood having an opening on the bottom allowing air to exit the air handling unit; and
an exhaust damper located on the first side of the wall, the exhaust damper located at the inlet of at least one of the one or more fans such that a portion of the air is drawn through the exhaust damper into the inlet of the at least one or more fans, wherein the air handling unit is configured such that the portion of the air that is drawn through the exhaust damper travels into the exhaust hood for exiting the air handling unit and another portion of the air enters the mixbox damper located on the second vertical wall for entering the mixbox, wherein the wall is a diagonal wall and the one or more fans and the exhaust damper are mounted on the diagonal wall.

2. The air handling unit of claim 1, wherein the one or more fans are three fans, wherein the three fans are located on the wall in a horizontal line.

3. The air handling unit of claim 1, wherein the one or more fans are six fans, and the six fans are located on a back wall of the air handling unit in two horizontal lines of three fans each, and wherein the horizontal lines of three fans are vertically displaced from one another.

4. The air handling unit of claim 1, wherein the wall is the back wall of the air handling unit and wherein the first side faces an inside of the air handling unit and the second side faces an outside of the air handling unit.

5. The air handling unit of claim 1, wherein at least a portion of the one or more fans extends into the exhaust hood.

6. A rooftop air handling unit, comprising:

a return air inlet, a chamber in fluid communication with the return air inlet, the chamber defined in part by a first wall, wherein the first wall has a first side facing the chamber and a second side facing away from the chamber, wherein the first wall is a side wall or a back wall of the rooftop air handling unit, one or more fans, each of the one or more fans including an inlet located on the side wall or the back wall, the inlet facing the chamber, wherein:

each of the one or more fans is cantilevered on the first wall such that it is outside the chamber, an exhaust hood mounted on the second side of the first wall, the exhaust hood having an opening configured to allow air to leave the air handling unit, the exhaust hood surrounding at least one of the one or more fans, an exhaust damper located on the first side of the first wall, the exhaust damper located at the inlet of at least one of the one or more fans such that a portion of the air is drawn through the exhaust damper into the inlet of the at least one or more fans, a mixbox damper, located on a second vertical wall of the chamber, the mixbox damper providing fluid communication between the chamber and a mixbox, a supply blower, a coil, located between the mixbox and the supply blower, and a supply air outlet in fluid communication with a conditioned space, wherein the rooftop air handling unit is configured such that the portion of the air that is drawn through the exhaust damper travels into the exhaust hood for exiting the rooftop air handling unit and another portion of the air enters the mixbox damper located on the second vertical wall for entering the mixbox, wherein the first wall is a diagonal wall and the one or more fans and the exhaust damper are mounted on the diagonal wall.

7. The rooftop air handling unit of claim 6, wherein the first wall is the back wall of the air handling unit and wherein the first side faces an inside of the air handling unit and the second side faces an outside of the air handling unit.

8. The rooftop air handling unit of claim 6, wherein the exhaust damper located at the opening of the exhaust hood.

9. A method of exhausting air from an air handling unit, comprising:

drawing an exhaust air flow including a portion of a return air flow through an exhaust damper, using one or more fans positioned cantilevered on a side wall or a back wall of the air handling unit such that each of the one or more fans is outside a return air inlet chamber of the air handling unit, each of the one or more fans including an inlet located on the side wall or the back wall, the inlet facing the return air inlet chamber, the exhaust damper located on the side wall or the back wall of the air handling unit, the exhaust damper located at the inlet of at least one of the one or more fans such that the portion of the return air is drawn through the exhaust damper into the inlet of the at least one or more fans, wherein the side wall or the back wall is a diagonal wall and the one or more fans and the exhaust damper are mounted on the diagonal wall;

directing the exhaust air flow into an exhaust hood mounted on said side wall or said back wall of the air handling unit, said exhaust hood surrounding the one or more fans; and the exhaust air flow leaving the exhaust hood by an opening provided on a bottom of the exhaust hood, and another portion of the return air flow passing through a mixbox damper provided on a second vertical wall of the return air inlet chamber to a mixbox, wherein the portion of the air that is drawn through the exhaust damper travels into the exhaust hood for exiting the air handling unit and another portion of the air enters the mixbox damper located on the second vertical wall for entering the mixbox.

10. The method of claim 9, wherein the exhaust air flow exits the air handling unit through a screen in the exhaust hood.

11. The method of claim 9, wherein the side wall or the back wall divides an interior of the air handling unit from an exterior of the air handling unit.

\* \* \* \* \*